US008479278B2

(12) United States Patent
Grouzdev et al.

(10) Patent No.: US 8,479,278 B2
(45) Date of Patent: *Jul. 2, 2013

(54) VIRTUALIZED SECURE NETWORKING

(75) Inventors: Vladimir Grouzdev, Montigny-le-Bretonneux (FR); Philippe Gautron, Palaiseau (FR)

(73) Assignee: Virtuallogix SA (FR)

( * ) Notice: Subject to any disclaimer, the term of this patent is extended or adjusted under 35 U.S.C. 154(b) by 762 days.

This patent is subject to a terminal disclaimer.

(21) Appl. No.: 12/572,506

(22) Filed: Oct. 2, 2009

(65) Prior Publication Data

US 2010/0088757 A1 Apr. 8, 2010

(30) Foreign Application Priority Data

Oct. 2, 2008 (EP) .................................. 08290934

(51) Int. Cl.
*G06F 9/00* (2006.01)

(52) U.S. Cl.
USPC ........ 726/14; 726/11; 726/3; 726/2; 709/229; 709/227

(58) Field of Classification Search
None
See application file for complete search history.

(56) References Cited

U.S. PATENT DOCUMENTS

| 8,121,146 B2 * | 2/2012 | Sood et al. .................... 370/466 |
| 2006/0070066 A1 | 3/2006 | Grobman |
| 2007/0064661 A1 | 3/2007 | Soodl et al. |
| 2008/0005791 A1 | 1/2008 | Gupta et al. |
| 2008/0022094 A1 * | 1/2008 | Gupta et al. .................. 713/165 |

OTHER PUBLICATIONS

S. Kent, K. Seo; BBN Technologies; Security Architecture for the Internet Protocol; Dec. 2005; 101 pages; [RFC 4301].

S. Kent; BBN Technologies; IP Authentication Header; Dec. 2005; 7 pages; [RFC 4302].

S. Kent; BBN Technologies; IP Encapsulating Security Payload (ESP); Dec. 2005; 44 pages; [RFC 4303].

J. D. Day, H. Zimmermann; The OSI Reference Model; Proceeding of the IEEE, vol. 71, No. 12, pp. 1334-1340; Dec. 1983; 7 pages [OSI model].

European Patent Office Communication, European Search Report and Examination for Application EP 08290934, Mar. 27, 2009, 7 pages.

IP.COM Journal, IP.COM Inc., West Henrietta, NY, US, "Virtualizing Network Adapters Using OS Services in a Hypervisor Environment," Sep. 1, 2004, XP013021324 ISSN: 1533-0001.

* cited by examiner

*Primary Examiner* — Pramila Parthasarathy

(74) *Attorney, Agent, or Firm* — Beem Patent Law Firm

(57) ABSTRACT

The invention provides a data processing system for the support of secure networking on a single, virtualized hardware platform. The data processing system comprises a Network Interface Controller NIC to control access to a physical network; a first operating system comprising an NIC driver to manage the NIC, and a first Virtual Network Interface Controller VNIC driver. The system further comprises at least one second operating system comprising at least one second VNIC driver associated with a networking stack; and a Virtual Machine Monitor VMM to enable concurrent operation of the first and second operating systems, and to emulate a virtual network, the VMM comprising first and second VNICs to provide access to the virtual network by the first and second operating systems through the first and second VNIC drivers, respectively. The first operating system further comprises a bridge driver in between the NIC driver and the first VNIC driver to manage the connection between the physical network and the virtual network.

9 Claims, 15 Drawing Sheets

VIRTUALIZED SECURE NETWORKING

CROSS-REFERENCE TO RELATED APPLICATIONS

This U.S. patent application claims the benefit of priority from European patent application no. 08290934.2, filed Oct. 2, 2008.

BACKGROUND OF THE INVENTION

1. Field of the Invention

The present invention relates to a data processing system which forms an improved architecture of secure networking on a virtualized hardware platform.

2. Description of the Related Art

The following documents are referred to in the description: [RFC 4301] S. Kent, K. Seo. December 2005. *Security Architecture for the Internet Protocol*; [RFC 4302] S. Kent. December 2005. *IP Authentication Header;* [RFC 4303] S. Kent. Dec. 2005. *IP Encapsulating Security Payload (ESP)*; [OSI model] J. D. Day, H. Zimmerman. 1983. *The OSI reference model.*

Secure Internet Protocols (IP) are specified by the Internet Protocol Security Architecture (IPsec). These specifications define two mechanisms for protecting data transiting through the Ethernet network: authentication and confidentiality. IPsec architecture is specified in [RFC 4301], authentication in [RFC 4302], and confidentiality in [RFC 4303]. These protocols are usually supplied by an IP networking stack, as additional protocols to the IP protocols.

IPsec configuration is specified through cryptographic and traffic rules. Secure communication channels are so defined between endpoint hosts, more precisely between the IP addresses of these hosts.

In this context, the goal of hardware virtualization is to provide multiple Operating System (OS) execution environments on a single hardware platform. Based on this principle, virtual Ethernet networks can be instantiated on the platform to connect different IP networking stacks supported by different OSs. As in the case of typical networks, a virtual network can also be bridged to another virtual network, or to a physical network external to the platform.

The present invention is concerned with creating an improved architecture for secure networking which provides secure IP execution environments to applications of virtualized operating systems. The architecture of the present invention applies to both IPv4 and IPv6 protocols.

SUMMARY OF THE INVENTION

The invention is recited by the independent claims, preferred features are recited by the dependent claims.

The general purpose of the invention is to achieve a greater level of security in a hardware architecture which provides multi-level OS protections. In particular, the purpose of the invention is to enhance the protection of system resources, in particular to increase confidentiality and integrity of data at hardware level.

The present invention recognizes that applications of networking stacks may require both transparent and secure communications according to the destination host. In order to achieve this, one would potentially need to use different Network Interface Controllers (NICs) which would obviously cost additional hardware resources and would thus be to the detriment of the system.

In contrast to using different NICs, the data processing system according to the invention comprises a data processing system which enables the implementation for the support of secure networking on a single, virtualized hardware platform. The data processing system of the present invention comprises a Network Interface Controller NIC to control access to a physical network. A first operating system comprises a NIC driver to manage the NIC, and a first Virtual Network Interface Controller (VNIC) driver. The system also comprises at least one second operating system comprising at least one second VNIC driver associated with a networking stack. Furthermore, a Virtual Machine Monitor (VMM) is provided to enable concurrent operation of the first and second operating systems, and to emulate a virtual network. The VMM according to the present invention comprises first and second VNICs and provides access to the virtual network by the first and second operating systems through the first and second VNIC drivers, respectively. Additionally, the first operating system further comprises a bridge driver in between the NIC driver and the first VNIC driver to manage the connection between the physical network and the virtual network.

In other words, the data processing system according to the present invention provides a virtualized platform which takes advantage of hardware architecture that provides multi-level OS protections, and implements a trusted OS at the highest level of security while instantiating the virtualized operating systems at a lowest level. The virtualized architecture proposed by the present invention enables the configuration of a networking stack connected to different virtual networks. These virtual networks can be connected to merely a single NIC through a transparent bridge or a secure bridge. In this manner the present invention enables no limitation of resources, thus obviating the need of additional hardware resources. Therefore, the system of the present invention optimizes valuable hardware resources by means of such a bridge.

Furthermore, in terms of security, the system of the present invention enables endpoint communications to be crypted or not according to the virtual network used as support for the communication channel. The present invention also enables the transit of crypted and uncrypted communications through different virtual networks since their mutual exclusion is guaranteed by the trusted OS.

Another feature of the present invention is its flexibility. The architecture according to the invention can be easily adapted to any OS able to act as trusted OS, or to any VMM. This enables the flexibility of the networking configuration i.e. an easy-to-change network configuration wherein network topology is configured at trusted OS level. Hence, the present invention obviates the need to modify the guest OS configuration to adapt the security requirements to a given network topology.

In summary, the present invention realizes a networking stack which takes advantage of a virtual networking support to supply generic, secure IP services to applications, whilst at the same time protecting sensitive IPsec configuration data and preserving both data integrity of the communication channels and networking configuration flexibility.

BRIEF DESCRIPTION OF THE DRAWINGS

Embodiments of the invention will now be described, by way of examples only, with reference to the accompanying drawings, in which.

DETAILED DESCRIPTION OF THE DRAWINGS

Definitions

Execution Environment: Hardware and/or software for providing the environment in which applications and/or services can be executed. Examples: operating systems, device drivers;

Native Driver: A software module that manages a physical device;

Partition: Subset of hardware resources of a data processing system, which subset is allocated to an Execution Environment;

Secure Bridge: A bridge driver configured to manage IPsec protocols in addition to the IP protocols;

Transparent Bridge: A bridge driver configured to manage IP protocols only;

Virtual Driver: A software module that manages a virtual device;

Virtual Machine: A software implementation of e.g. computer which executes programs just like a real machine allowing e.g. the sharing of the underlying physical machine resources between different virtual machines, each running its own operating system;

Virtual Machine Monitor: A virtualization platform enabling multiple OS instances to run concurrently on a same physical platform.

System Architecture Foundations

Typical Operating Systems implement an IP networking stack to provide IP services to applications. Authentication and confidentiality are supported as additional, Virtualized Secure Networking configurable protocols to the IP protocols. The document [RFC 4301] distinguishes three categories for the support of the IPsec protocols:

(a) the IPsec protocols are integrated directly into the IP networking stack;

(b) the IPsec protocols are implemented by an independent stack. This implementation is referred to as bump-in-the-stack (BITS) implementation; and (c) the IPsec protocols are implemented by a dedicated, inline processor. (Although similar to the BITS implementation, this implementation is referred to as bump-in-the-wire (BITW) implementation).

Hardware Virtualization

Figure 1:
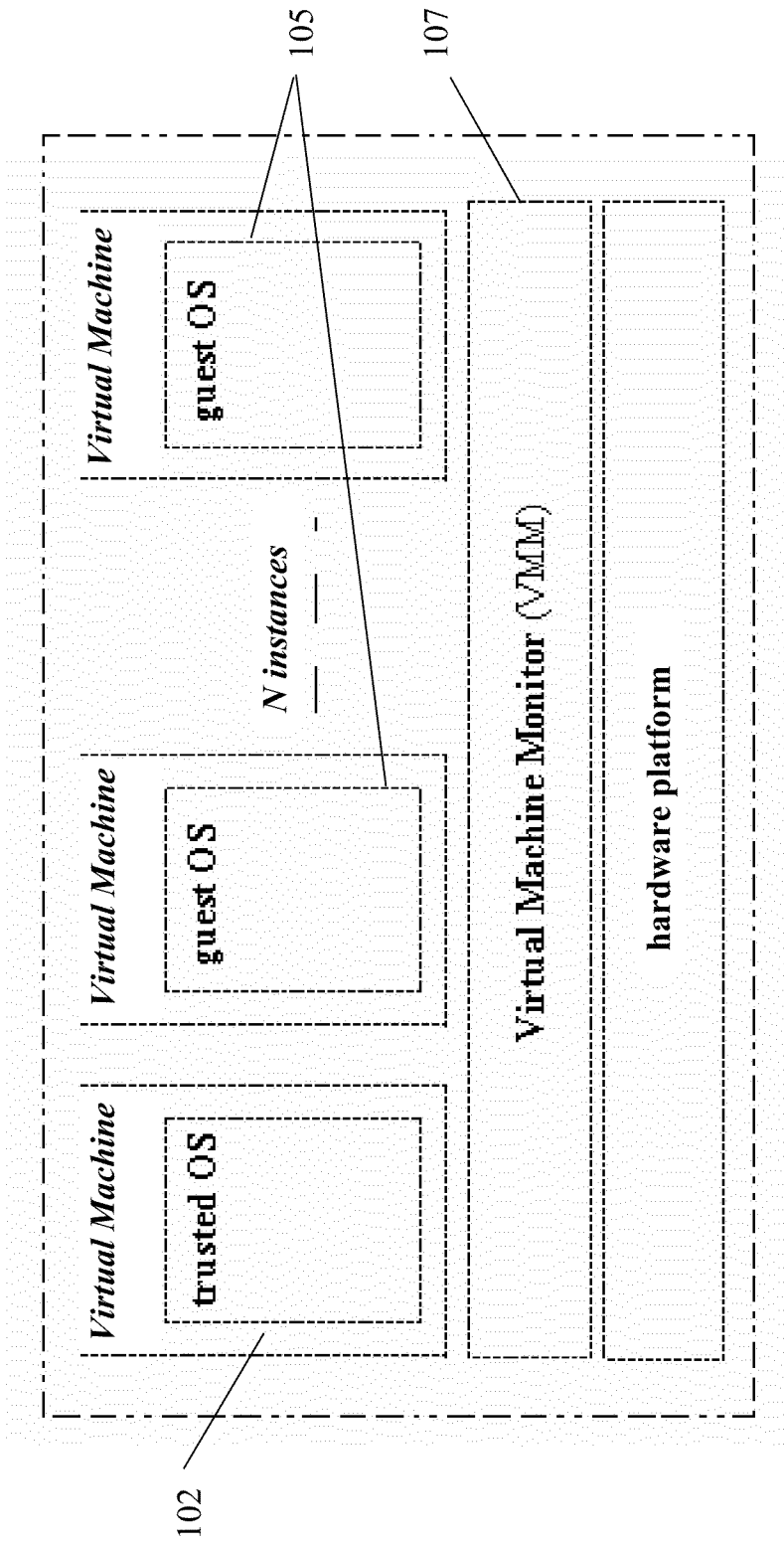
FIG. 1 is a schematic block diagram illustrating a basic hardware virtualization model comprising a trusted OS instance and multiple guest OS instances.

Operating system (OS) virtualization according to an embodiment of the present invention is based on hardware virtualization managed by a Virtual Machine Monitor (VMM). According to an embodiment of the invention, the hardware platform is split in physical partitions, each partition defining multiple Virtual Machine (VM) supports. The VMM enables multiple OS instances to then run concurrently on a same physical platform. An embodiment according to an embodiment of the present invention introduces one specific, "trusted OS" 102 instance and multiple "guest OS" 105 instances as illustrated in FIG. 1. A "trusted OS" 102 may be differentiated from a "guest OS" 105 by the following:

specific parts of system resources required by the VMM are only handled by the trusted OS 102;

a trusted OS 102 is not intended to be necessarily a general-purpose, full operating system;

a trusted OS 102 may run with system privileges superior to guest OS 105 privileges (in term of resource access for example).

However, whether the trusted OS 102 and the guest OS 105 are similar OSs or different OSs is not relevant for the present invention. Similarly, whether the different guest OSs 105 are similar OSs or different OSs is also not relevant for the present invention. Moreover, the networking architecture according to an embodiment of the present invention does not rely on a particular hardware architecture and is thus not limited in this respect. The only requirement is that the trusted OS 102 provides a multi-thread support.

Figure 2:
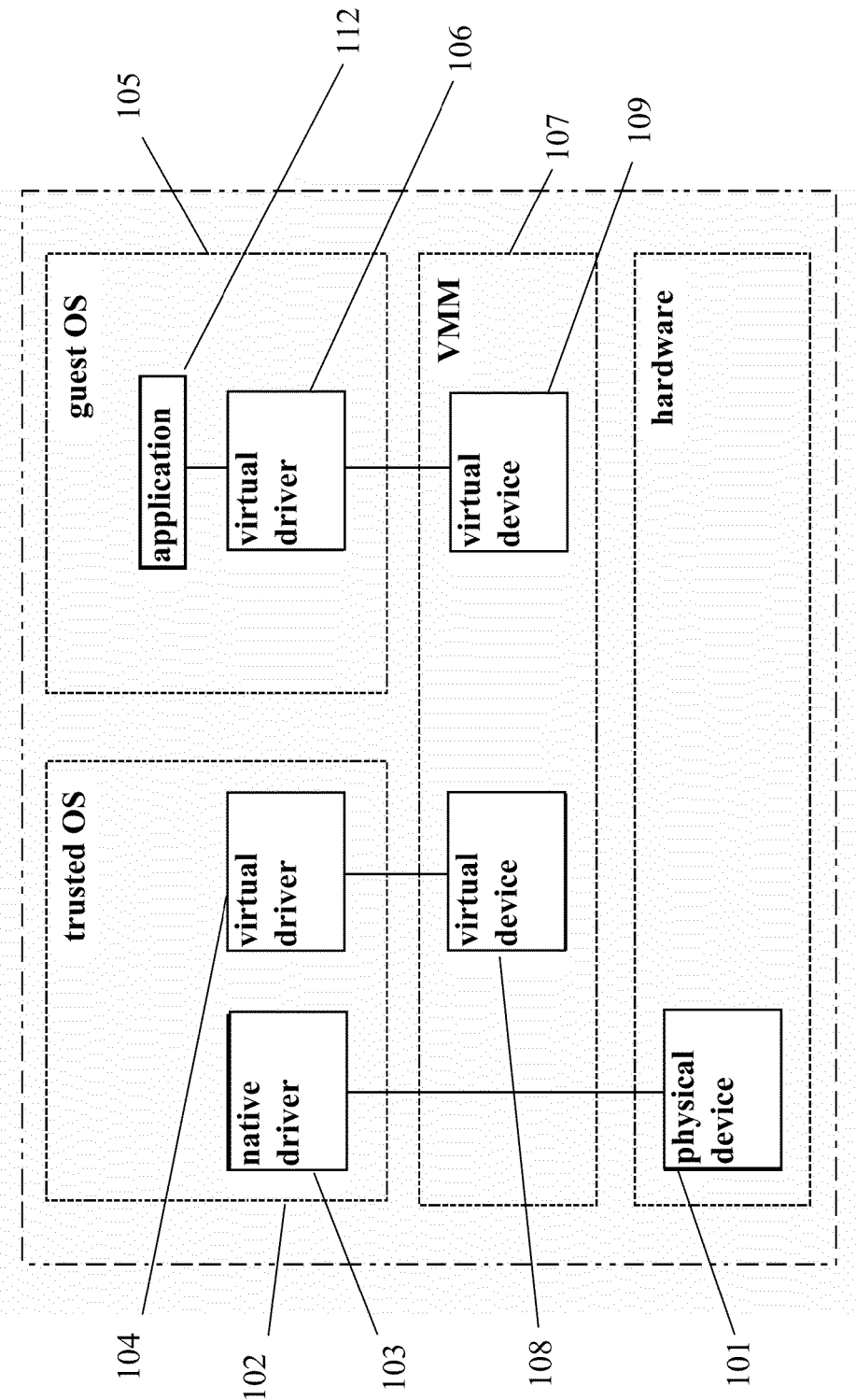
FIG. 2 is a schematic block diagram illustrating a generic virtualization architecture according an embodiment of the present invention.

Although physical devices could be attached directly to a guest OS 105, physical devices will be all considered as attached to the trusted OS 102. The trusted OS 102 obtains access to the physical devices through the native drivers while a guest OS 105 achieves access to virtualized devices through virtualized drivers as illustrated in FIG. 2.

Figure 3:
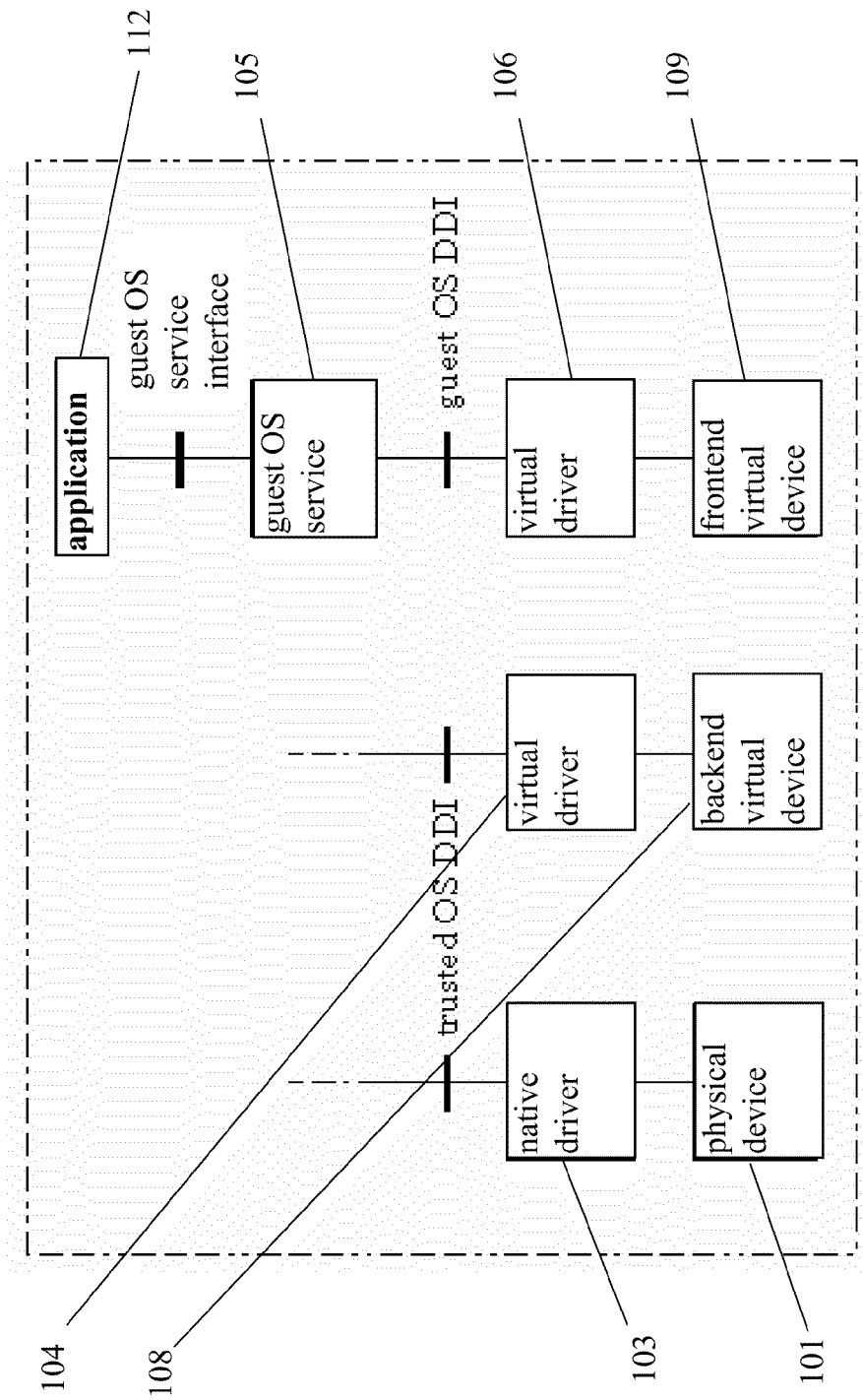
FIG. 3 is a schematic block diagram illustrating generic interfaces.

The device virtualization of the present invention is achieved using a software module, the virtual device, that emulates the physical device. The generic virtualization architecture of FIG. 2 also comprises a native driver and at least one virtual driver. These drivers abstract the nature of the device, and export a same interface. Device virtualization is then transparent to guest OS 105 applications, system applications as well as user applications. It should be noted that the trusted OS 102 and guest OS 105 in accordance with the present invention may be different operating systems. Therefore, as illustrated in FIG. 3, the respective Device Driver Interfaces (DDI) exported by the native driver and the virtual driver are OS specific.

The section of the description entitled "Transparent Bridging" shows how the native driver and the virtual driver are managed by the trusted OS 102 for the networking architecture. Moreover, the trusted OS 102 provides basic software execution resources, such as threads, to manage the different resources available on the platform, software resources as well as hardware resources.

Virtual Networking Architecture

Figure 4:
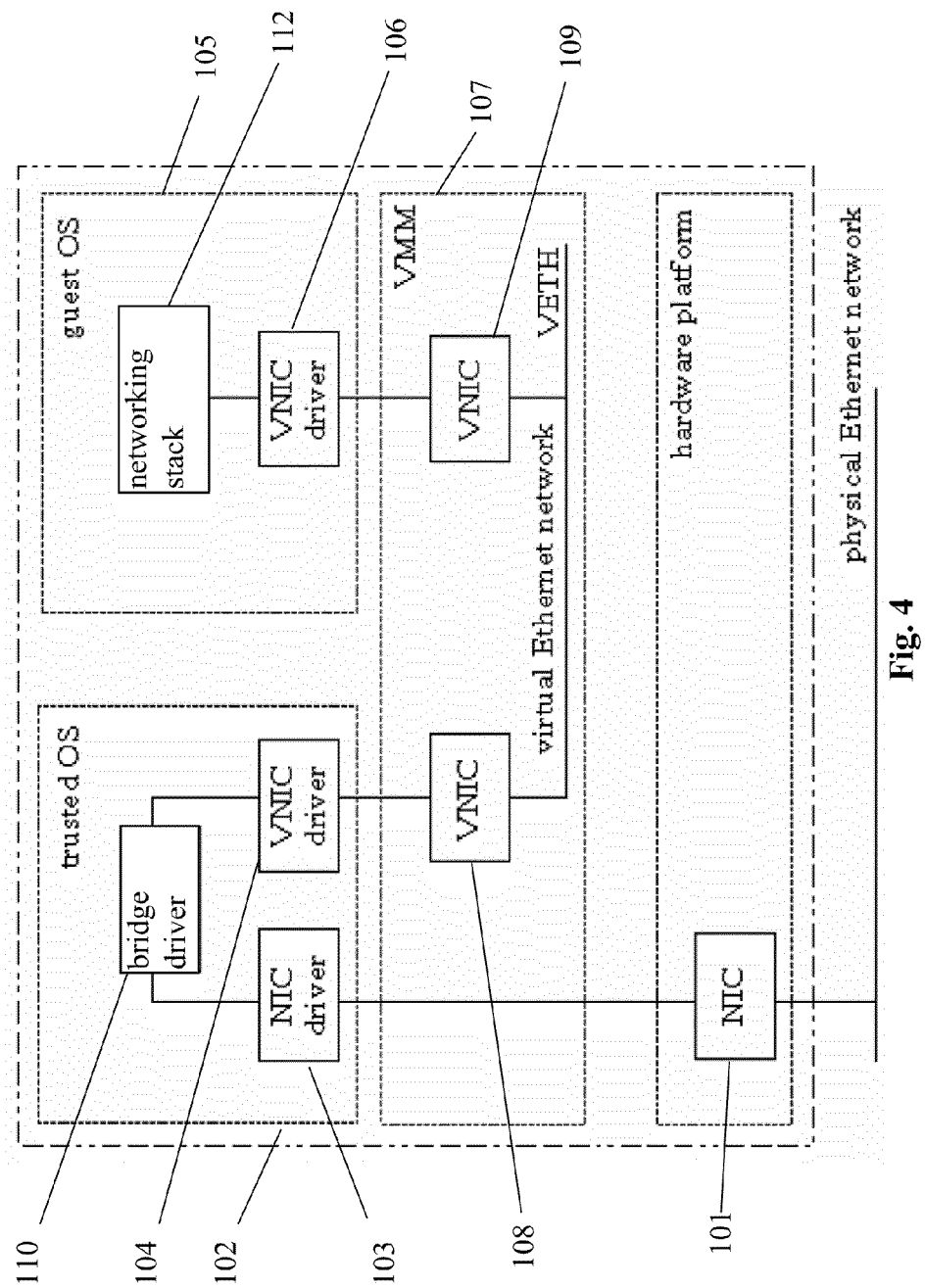
FIG. 4 is a schematic block diagram illustrating a virtualized hardware platform according to an embodiment of the present invention.

FIG. 4 illustrates most software modules of a virtual networking architecture according to an embodiment of the present invention as based on the generic virtualization architecture of FIG. 2. The virtual networking architecture of FIG. 4 comprises a single virtualized hardware platform with a single trusted OS 102 and a single guest OS 105 instance. The virtualized hardware platform comprises a network interface controller (NIC) 101 which is a physical Ethernet device providing connection of the hardware platform to the physical Ethernet network i.e. the NIC 101 primarily controls access to the physical network. The trusted OS 102 comprises a software module running thereon This software module is an NIC driver 103 which is the native driver that manages the NIC device 101. The virtual networking architecture additionally comprises a VMM 107 which emulates a virtual Ethernet network (VETH) and creates two instances of virtual NIC device (VNIC) to provide access to the virtual Ethernet network. The VNIC drivers are virtual drivers which manage the respective VNIC devices i.e. instances. In this embodiment, both the trusted OS 102 and the guest OS 105 run an instance of VNIC driver. Both the NIC drivers as well as the VNIC drivers are identified in a unique way by their Media Access Control address (MAC). In contrast to the generic virtualization architecture illustrated in FIG. 2, FIG. 4 additionally shows that the guest OS 105 comprises a networking stack. The network stack constitutes the (system) application client of the VNIC driver running in the guest OS 105. Additionally, the trusted OS 102 comprises a further software module running thereupon. This further software module is known as a bridge driver 110 and serves the purpose of managing the connection between the physical network and the virtual network. This bridge driver 110 is client both of the NIC driver 103 and of the VNIC driver 106.

Figure 5:
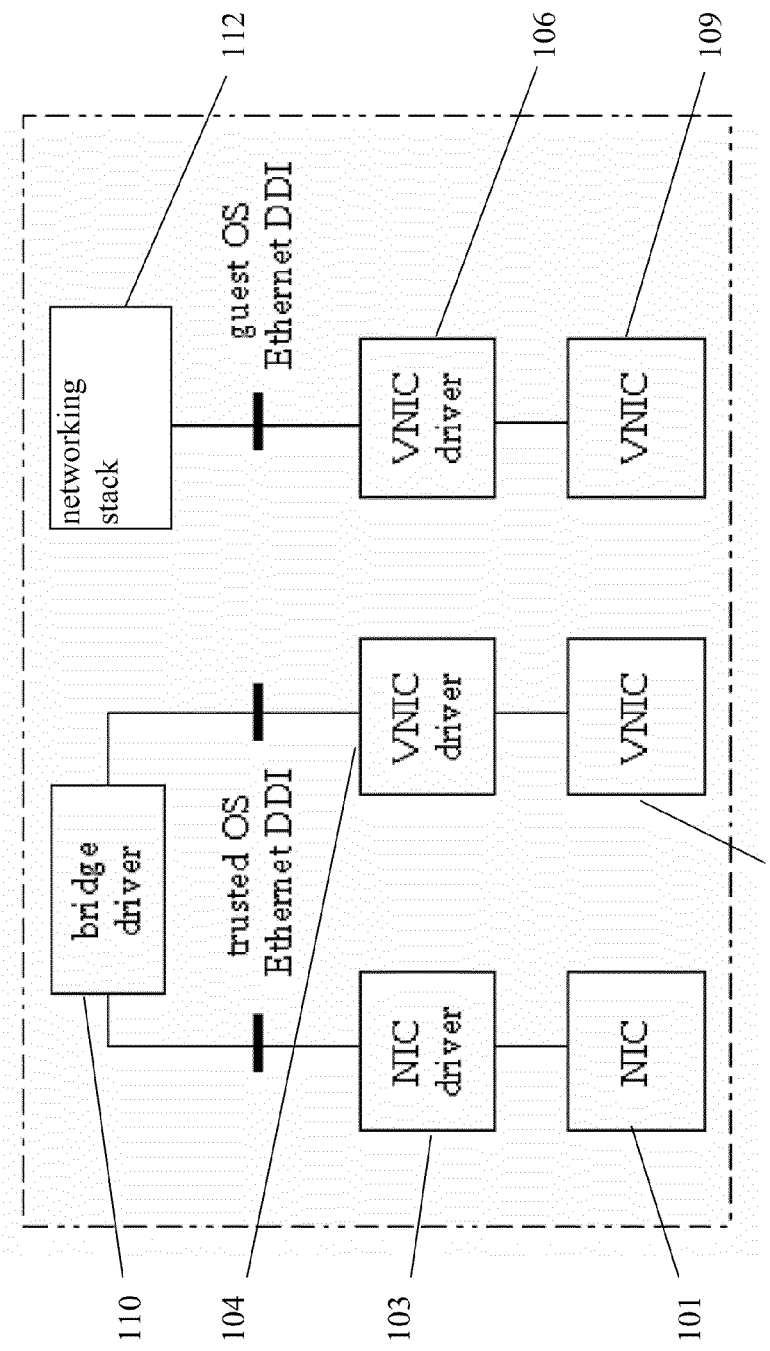
FIG. 5 is a schematic block diagram illustrating the different networking interfaces corresponding to the architecture of FIG. 4.

FIG. 5 illustrates different (networking) interfaces corresponding to the architecture of the present invention as based on the generic interfaces illustrated in FIG. 3. In particular, FIG. 5 shows how in one embodiment of the invention, Ethernet DDI interfaces are exported by both the NIC and VNIC drivers. However, the interfaces supplied by the trusted OS 102 and the guest OS 105 may differ, without impact on the architecture illustrated in FIG. 5.

Security and Networking

A known mono-OS hardware architecture may comprise a networking stack 112 directly connected to a physical network through the native driver, however, according to the networking virtualization architecture illustrated in FIG. 4, hardware virtualization allows the introduction of an intermediate network layout fully managed by the trusted OS 102. Since any network communication transits through the trusted OS 105, network security can be introduced at this intermediate network layout, fully managed by the trusted OS 102. In such a networking architecture, IPsec protocols can be managed at bridge driver 110 level. In addition to this embodiment of the present invention, it should be noted that IPsec protocols can be configured at networking stack level (in correspondence with the first category of implementation described under the heading "System Architecture Foundations"). However, the implementation proposed in the present embodiment is strictly independent of the networking stack support. For the sake of clarity and to emphasize the present invention, only standard IP protocols should be considered to be configured by these stacks 112.

Transparent Bridging

Figure 6:
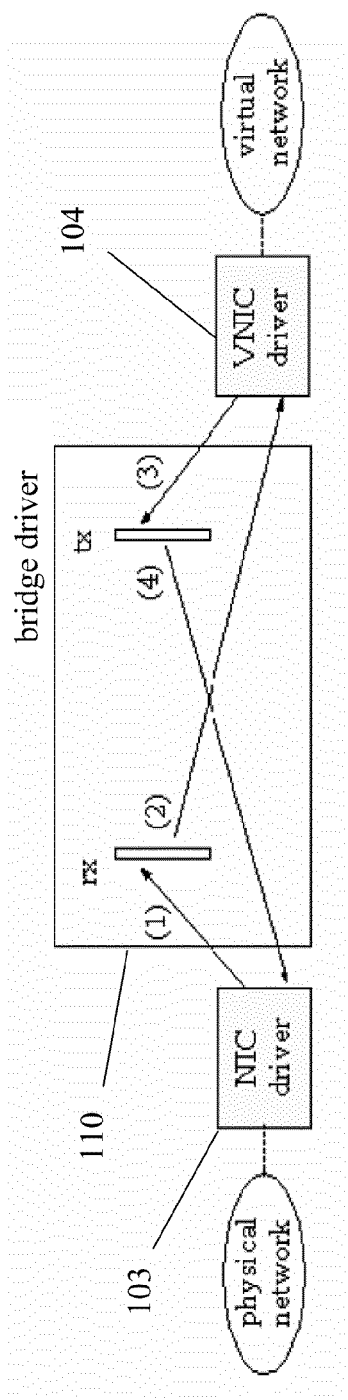
FIG. 6 is a schematic block diagram illustrating a transparent bridge implemented by a bridge driver.

The implementation of a transparent bridge forms the base of the implementation of the secure bridge. In a further embodiment of the present invention, a transparent bridge acts as a hub connecting two networks, the physical network and a virtual network, and processing simple packet forwarding between the two networks. The transparent bridge is implemented by a bridge driver 110 which instantiates two system threads, one for each direction of communication, as illustrated in FIG. 6. For the purpose of understanding the present invention, the communication received from the physical network is to be considered as the reference for the communication direction. With reference to FIG. 6, the nomenclature "rx" is referred to as the "reception thread", and "tx" as the "transmission thread". According to this embodiment of the present invention, an incoming packet at stage 1 is first processed by the "rx" thread. Once processed, the ingoing packet at stage 2 is transmitted on the virtual network. In a next step, an outcoming packet at stage 3 is first processed by the "tx" thread. Once processed, the outgoing packet at stage 4 is subsequently transmitted on the physical network. The two directions of communication are handled independently by the two threads. Thus, the bridge driver 110 in FIG. 6 implements two distinct, unidirectional communication channel thereby enabling the subsequent facilitated adaptation of thread processing to the communication direction if necessary. Additionally, this also enables the data required to manage a communication channel to be kept separate for each thread.

Figure 7:
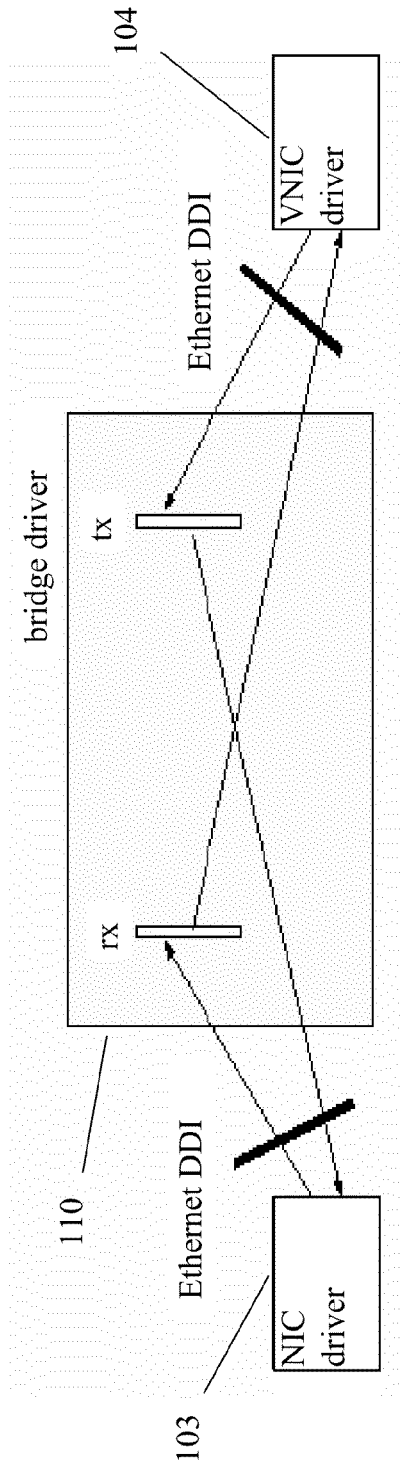
FIG. 7 is a schematic block diagram illustrating transparent bridge interfaces.

The threads described in the aforementioned obtain access to the network drivers using the Ethernet DDI interface as shown in FIG. 7. The bridge driver 110 is declared as client of the two drivers using the same Ethernet DDI interface.

Secure Bridging

Figure 8:
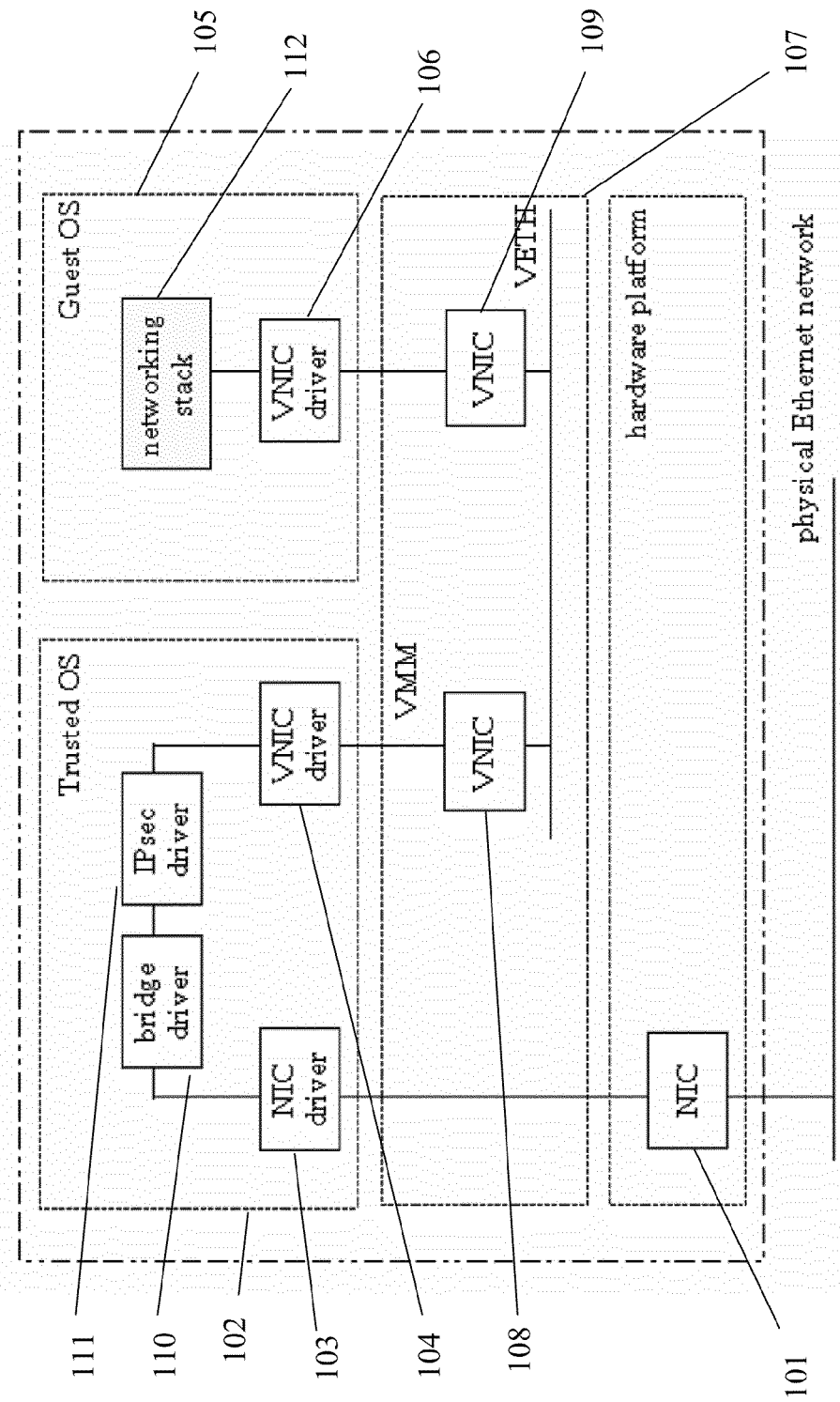
FIG. 8 is a schematic block diagram illustrating a secure bridge architecture.

According to an embodiment of the present invention, IPsec protocols are implemented by a second driver, the IPsec driver 111, which is handled by the trusted OS 102. The bridge driver 110 is piped to the IPsec driver 111 to form a secure bridge, as illustrated in FIG. 8. In comparison to the transparent bridge architecture described in FIG. 4, the architecture of FIG. 8 differs by virtue of the adjunction of the IPsec driver 111 to the bridge driver 110 handled by the trusted OS 102.

In a way similar to the transparent bridge, a secure bridge instantiates two system threads, one for each direction of communication. However, in the embodiment illustrated in FIG. 9. these two threads are dispatched between the two drivers. According to this embodiment, an incoming packet at stage 1a is first processed by the rx thread of the bridge driver 110. In the next step, the packet is forwarded to the IPsec driver 111 at stage 2a. IPsec processing at stage 3a is then executed by the rx thread within the context of the IPsec driver. Upon having been IPsec processed, the ingoing packet stage at 4a is subsequently transmitted on the virtual network. An outcoming packet at stage 5a is first processed by the tx thread of the IPsec driver 111. IPsec processing is executed by this thread. Then the packet is forwarded to the bridge driver 110 at stage 6a. Transparent bridge processing is then executed by the tx thread within the context of the bridge driver 110 at stage 7a. Once processed, the outgoing packet at stage 8a is transmitted on the physical network.

Figure 9:
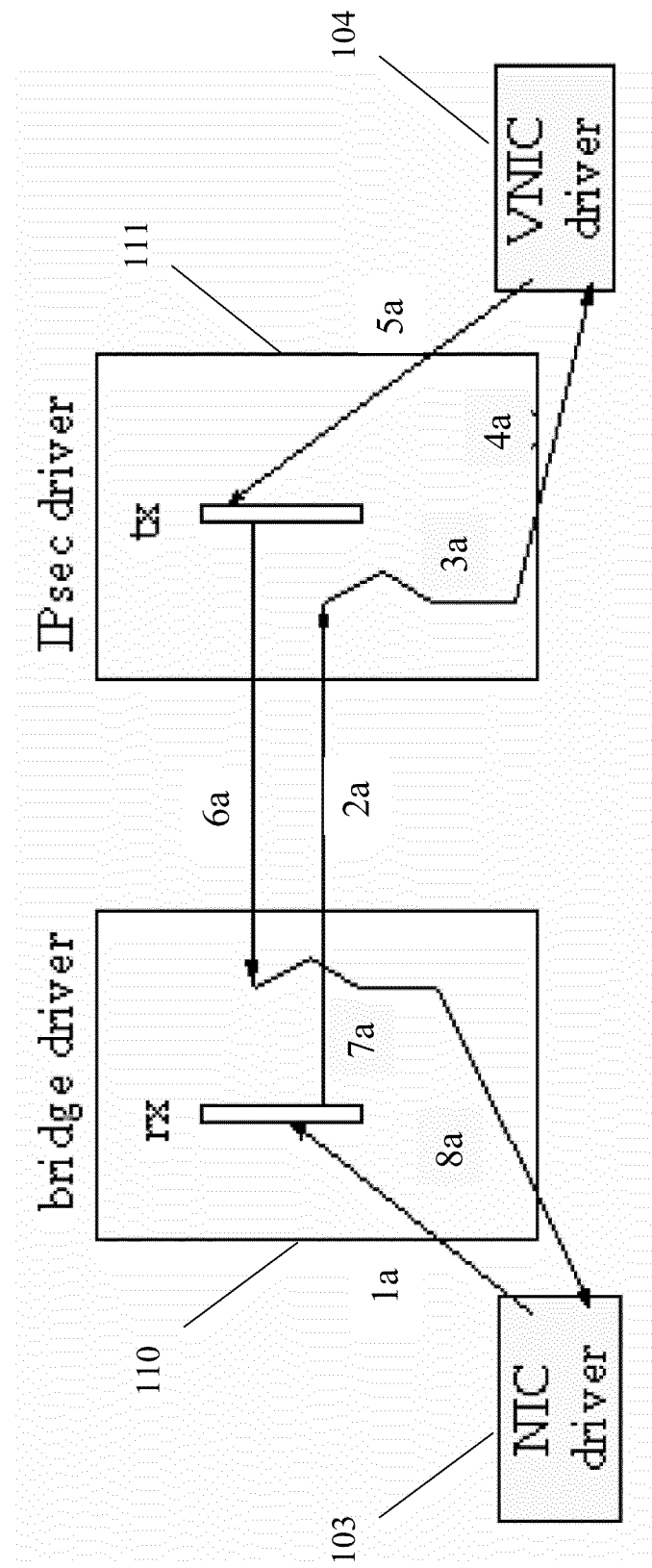
FIG. 9 is a schematic block diagram illustrating a secure bridge implementation.

It should be noted that in the system of FIG. 9, any IPsec processing is performed within the context of the IPsec driver 111, that is from code exclusively implemented by the IPsec driver 111. Furthermore, an important feature of a multi-thread OS support is to allow a clear separation between the system entity encapsulating the implementation of a driver (through separate compilation unit) from the system entity executing the driver code. In this manner, a thread created in the bridge driver 110 may execute some code implemented for the IPsec driver 111 (and vice-versa) while preserving the code encapsulation.

IPsec processing, according to the secure bridging implementation of the present invention as shown in FIG. 9, transpires as follows:
- for incoming packets, the IPsec processing is performed in stage 3a by the rx thread within the context of the IPsec driver 111;
- for outcoming packets, the IPsec processing is performed between the stages 5a and 6a by the native tx thread.

Packet forwarding according to this implementation comprises:
- for incoming packets, the packet forwarding is performed between the stages 1a and 2a by the native rx thread;
- for outcoming packets, the packet forwarding is performed in stage 7a by the tx thread within the context of the bridge driver 110.

The trusted OS 102 support thus allows the clear separation of the code for packet forwarding in the bridge driver 110 from the code for IPsec processing in the IPsec driver 111.

Figure 10:
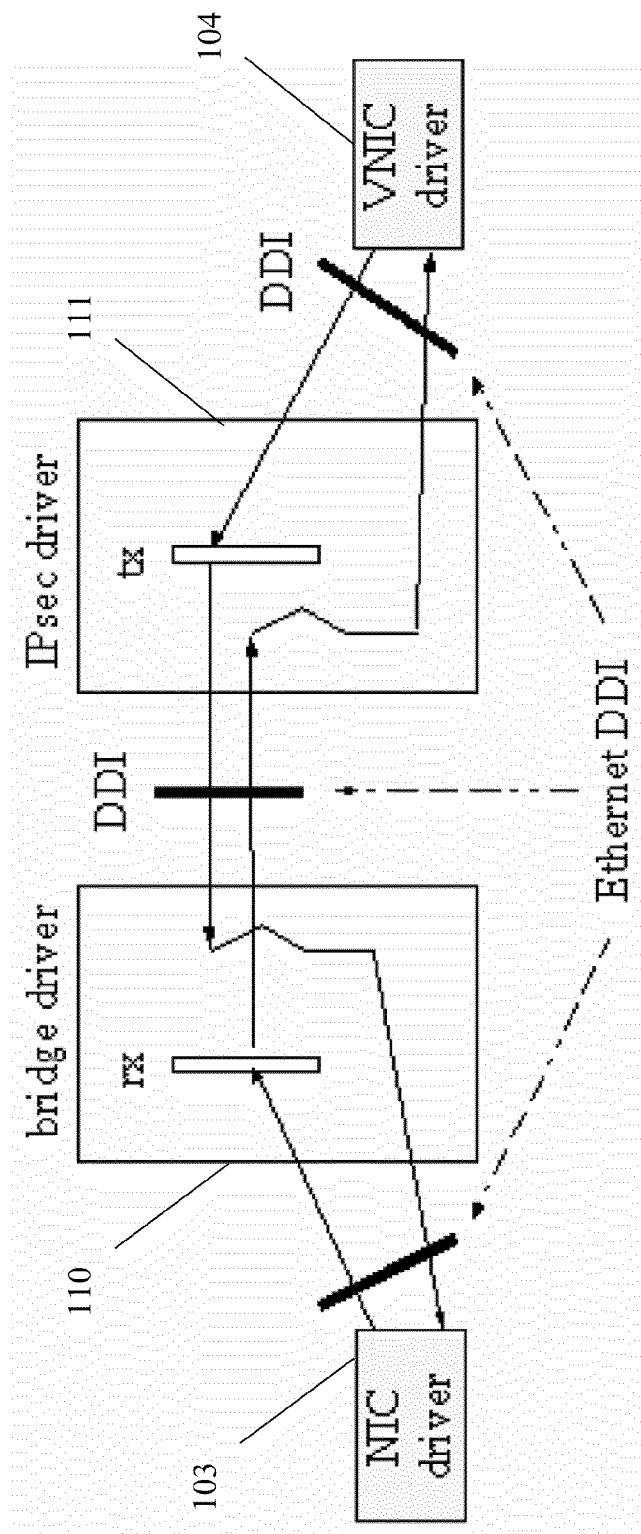
FIG. 10 is a schematic block diagram illustrating secure bridge interfaces.

According to the embodiment of the present invention shown in FIG. 8, the bridge driver 110 obtains access to the physical network as client of the NIC driver, and the IPsec driver 111 gets access to the virtual network as client of the VNIC driver. Access to these network devices is performed via an Ethernet DDI interface. In addition, the IPsec driver 111 exports to the bridge driver 110 an Ethernet DDI interface similar to the Ethernet DDI interface exported by the NIC and VNIC drivers 103, 104. This allows a bridge driver 110 to be client of the IPsec driver 111, as shown in FIG. 10.

A bridge driver 110 can be indifferently driver client of a VNIC driver 104 (transparent bridge) or of the IPsec driver 111 (secure bridge). Configuring a bridge as transparent bridge or secure bridge becomes so just a matter of configuration, independently of any IPsec processing consideration.

From the perspective of the bridge driver 110, forwarding a packet to the IPsec driver 111 or directly to the VNIC driver 104 is just a consequence of the network configuration. Similarly, receiving a packet from the IPsec driver 111 or directly from the VNIC driver is just a consequence of this same configuration.

Switch Configuration

According to another aspect of the present invention networking support can be extended to define, on a single i.e. the same platform, several virtual networks from a single i.e. the same bridge driver 110. The bridge driver 110 is then configured as switch.

In this sense, it should be noted that many topologies are possible. For instance, such topologies may include the combination of one or several NICs; secure or transparent bridging from the same bridge driver 110 or from different bridge drivers; or one or several networking stacks 112 connected through different VNICs to a same virtual network or to different virtual networks.

Figure 11:
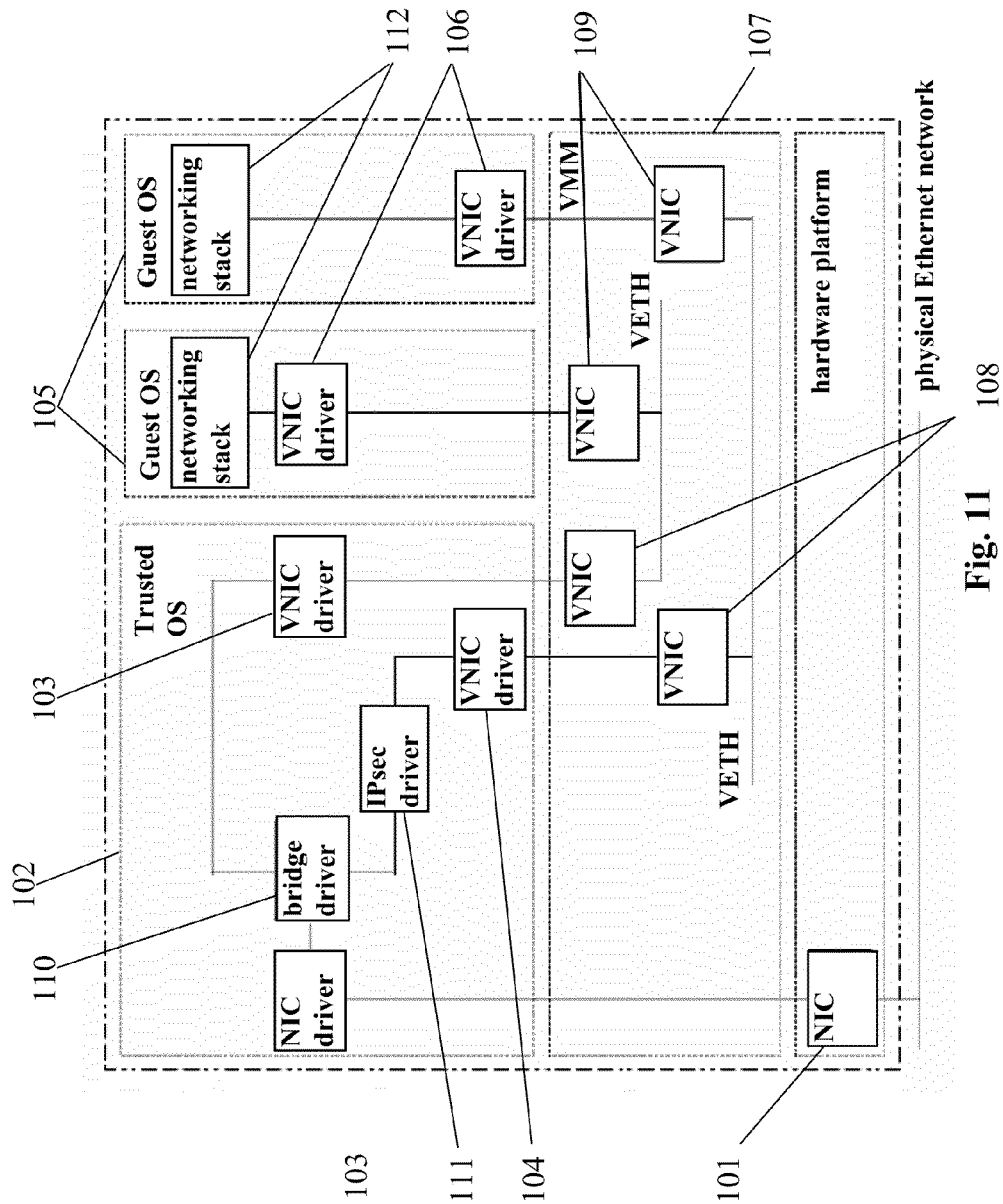
FIG. 11 is a schematic block diagram illustrating a first switch configuration.

FIG. 11 illustrates a first switch configuration comprising a single NIC, a single bridge driver 110 with transparent and secure bridging, two networking stacks 112 connected to different virtual networks. The first switch configuration of FIG. 11 defines two communication paths between the physical network and the networking stacks 112. Whilst traversing the trusted OS 102, one of the communication paths traverses a secure bridge and the other communication path traverses a transparent bridge.

Figure 12:
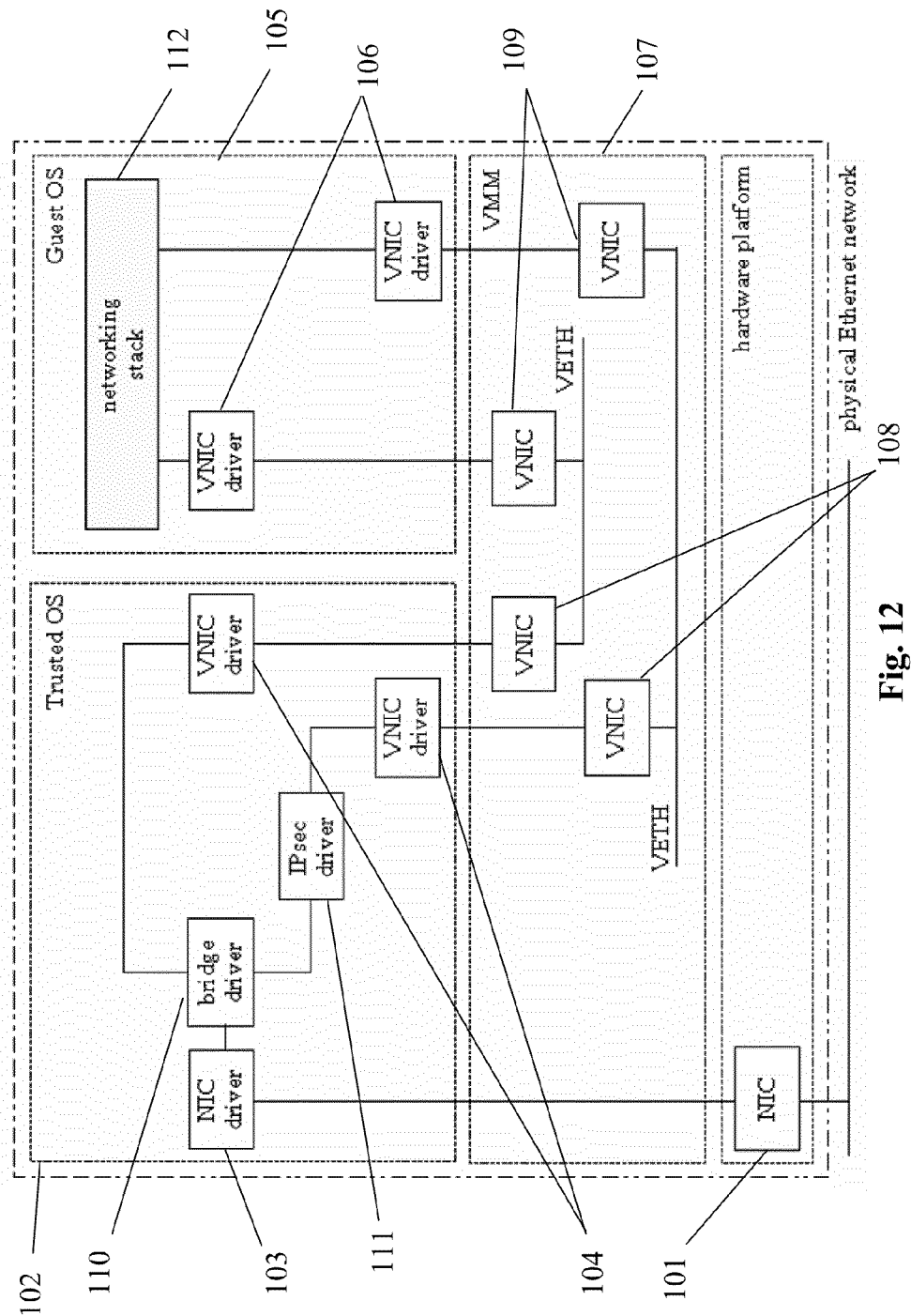
FIG. 12 is a schematic block diagram illustrating a second switch configuration.

FIG. 12 illustrates a second switch configuration comprising a single NIC, a single bridge driver 110 with transparent and secure bridging, a same networking stack 112 connected to different virtual networks. The second switch configuration of FIG. 12 defines two communication paths between the physical network and one networking stack 112. While traversing the trusted OS 102, one of the communication paths traverses a secure bridge and the other communication path traverses a transparent bridge.

Figure 13:
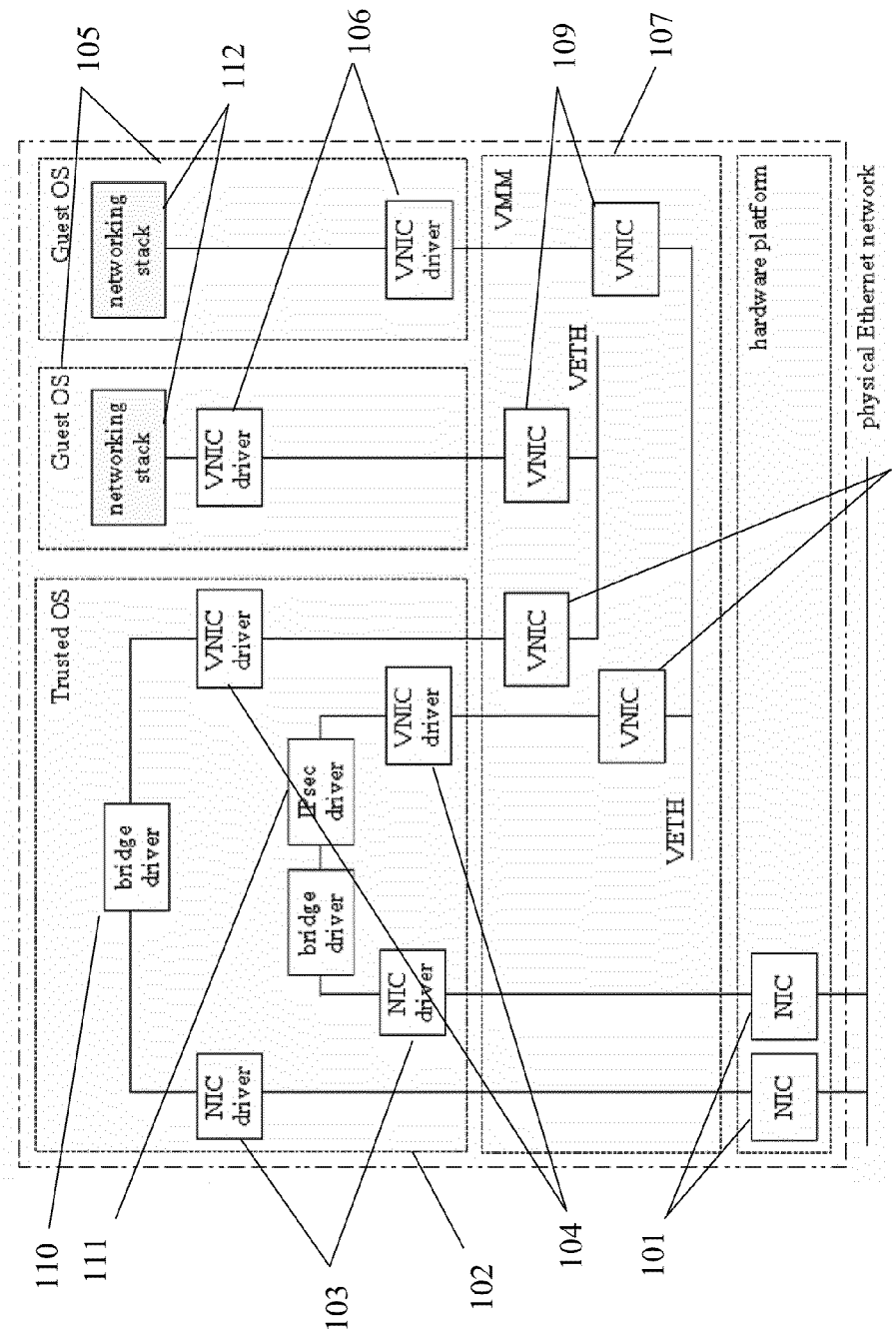
FIG. 13 is a schematic block diagram illustrating a third switch configuration.

FIG. 13 illustrates a third switch configuration comprising two NICs, two bridge drivers 110 with, respectively, transparent and secure bridging, two networking stacks 112 connected to different virtual networks. The third switch configuration of FIG. 13 defines two communication paths between the physical network and the networking stacks 112. While traversing the trusted OS 102, one of the communication paths traverses a secure bridge and the other communication path traverses a transparent bridge.

Figure 14:
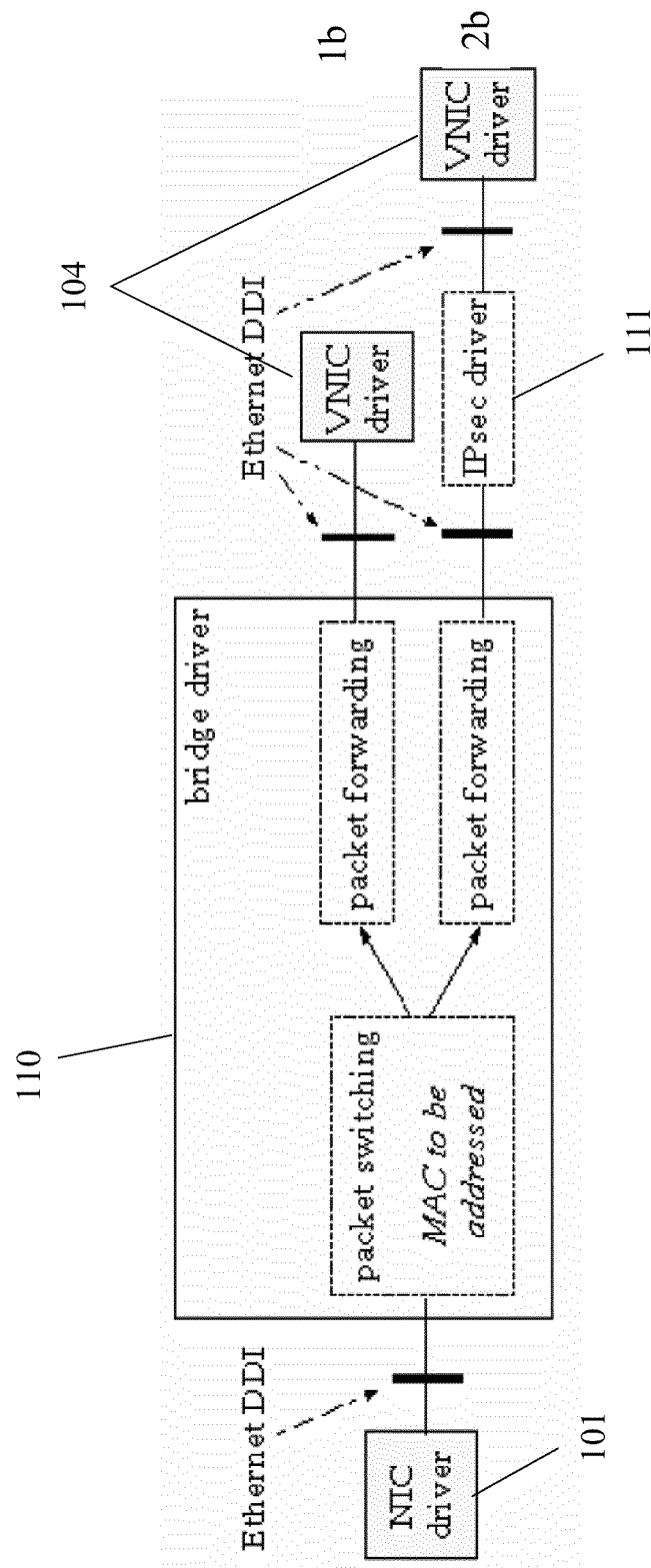
FIG. 14 is a schematic block diagram illustrating packet switching and packet forwarding for a transparent bridge and a secure bridge.

When a bridge driver 110 is configured as switch, incoming packet switching is performed by the rx thread. Packet switching is based on the MAC address of the different VNICs attached to the bridges. It is performed prior to packet forwarding, and thus, performed independently of any IPsec processing, as shown in FIG. 14 which illustrates packet switching and packet forwarding for a transparent bridge in stage 1b, and for a secure bridge in stage 2b.

Figure 15:
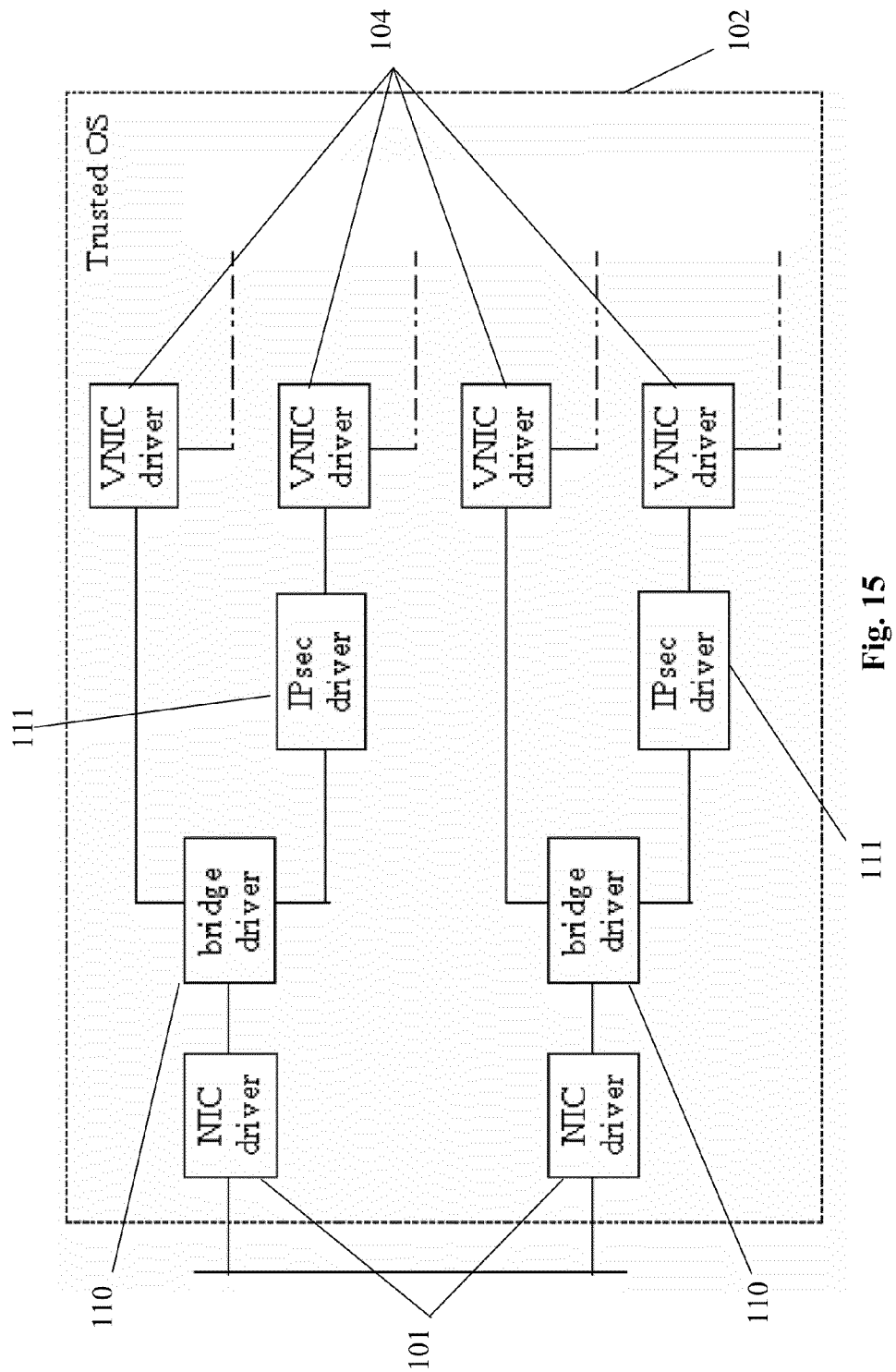
FIG. 15 is a schematic block diagram illustrating a simplified switch configuration example.

There are as many reception threads created as NIC drivers connected to a bridge, and as many transmission threads created as VNIC drivers connected to a bridge. To illustrate the threads instantiation for a switch, a simplified architecture according to an embodiment of the present invention is disclosed in FIG. 15.

Figure 16:
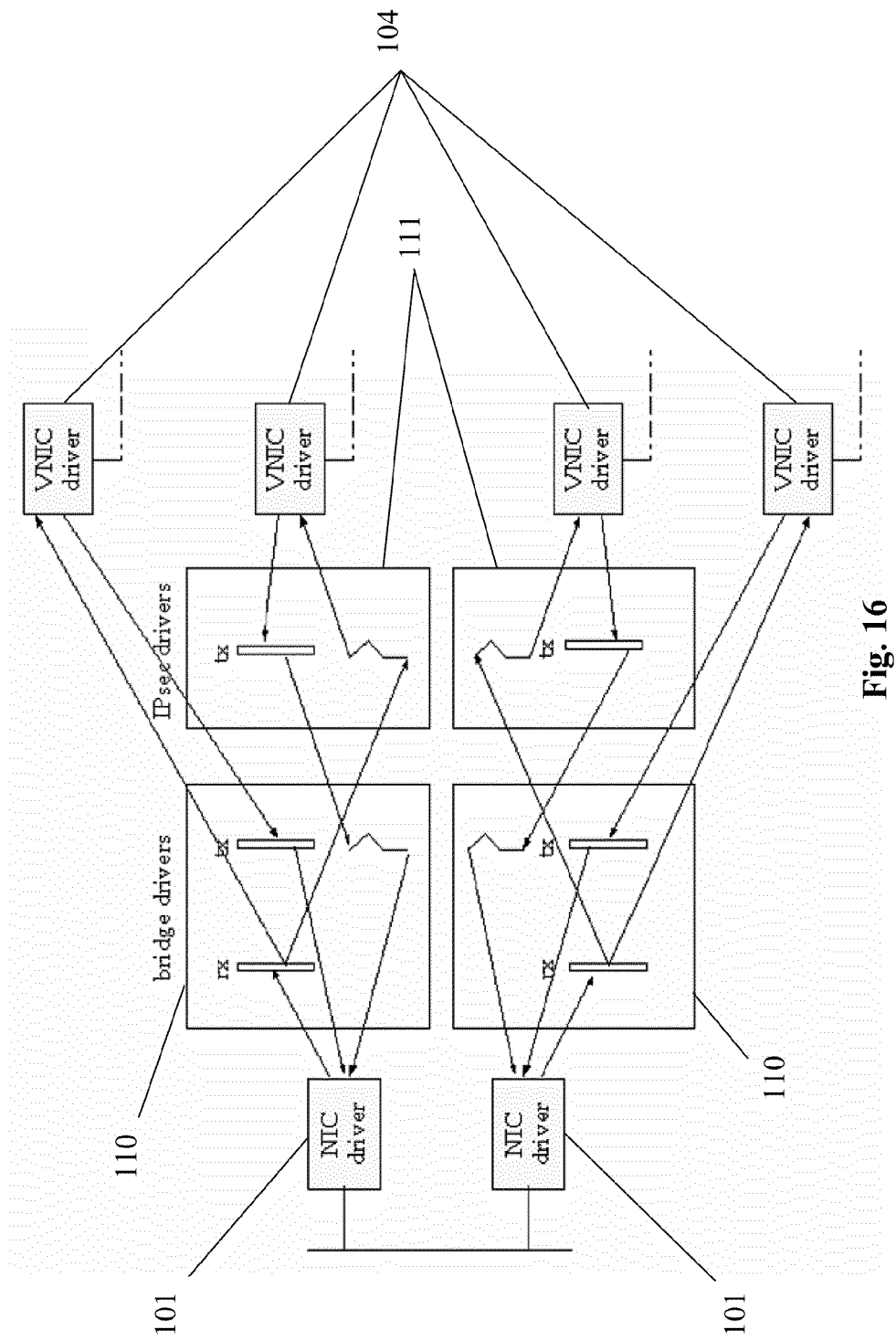
FIG. 16 is a schematic block diagram illustrating a switch thread intantiation.

FIG. 16 illustrates a further switch configuration example which defines four communication paths, from two NICs. In this configuration, only two paths are secured while traversing the trusted OS 102. Such a configuration results in the instantiation of two reception threads and four transmission threads, as shown. Two reception threads are created by the bridge drivers 110 for managing the two NIC drivers. Two transmission threads are created by the bridge driver 110 for managing the two VNIC drivers created for transparent bridging. Two reception threads are created by the IPsec drivers 111 for managing the two VNIC drivers created for secure bridging. It should be noted that in this embodiment, any IPsec processing is still confined to the IPsec drivers 111.

The architecture of the present invention comprises the combination two technologies, bump-in-the-stack (BITS) implementation of an IPsec networking stack and hardware virtualization, to supply secure IP services to operating system applications.

The architecture of the present invention is designed to be independent of the hardware architecture; the hardware virtualization model; the guest OS; and the guest OS networking stacks.

Network Support

With respect to the OSI IP layout model [OSI model], the architecture according to the present invention can be implemented as follows:
- the transparent bridge, more precisely the bridge driver 110, is implemented at OSI level 2 (data link layer);
- the secure bridge, more precisely the IPsec driver 111, is implemented at OSI level 3 (network layer);
- the networking stacks 112 are implemented at OSI level 4 (transport layer), OSI level 3 included.

Respective OSI layers of the different software modules are thus clearly identified. With respect to the categories of implementation described in the section entitled "System Architecture Foundations", the architecture proposed by the present invention separates the IPsec processing from the IP processing, and so falls clearly in the BITS category. This enables the virtual architecture of the present invention to support an implementation of IPsec independently of any guest OS support and allows native, proprietary IP networking stacks to be ported without modification on the virtual platform while benefiting from the IPsec support.

Further advantages of the data processing system of the present invention are:
- the optimization of resources i.e. only software modules relevant for a given configuration (networking stacks 112, bridges) need to be instantiated;
- transparency i.e. IPsec processing is transparent to the guest OS 105 networking stack 112;
- easy-to-change network configuration i.e. Network topology is configured at trusted OS 102 level. There is no need to modify the guest OS 105 configuration to adapt the security requirements to a given network topology.
- code optimization, easier maintenance and debug i.e. Each software module supplies identified services. Each module can be optimized, or enhanced without requiring to modify the other modules. For example, it is quite possible to port a new cryptographic library, or to add a new IPsec algorithm to the IPsec driver 111 without modifying the bridge driver 110 or the networking stack 112. Modifications are so transparently integrated to all the networking stacks 112.
- interface unification i.e. a single/same, unified Ethernet DDI interface is used to interface the different modules.

IPsec Configuration

The architecture according to an embodiment of the present invention eases the IPsec configuration by means of the following features:
- the rules are handled in one unique module, the IPsec driver, for a set of networking stacks instead of being distributed among the guest OS;
- the rules are specified using one unique, common semantic. System facilities used to configure the different networking stacks may be different for each operating system; and
- the rules are handled by the trusted OS and are not exposed to the guest OS.

In this manner, the present invention allows the enablement of the IPsec configuration for one particular networking stack, in addition to the IPsec driver support.

The architecture according to an embodiment of the present invention increases the security of sensitive endpoint communications two-fold in an easy manner. Different keys and different cryptographic supports can be used, resulting in communications more robust to hostile attacks.

In the present invention, IPsec support is fully handled by the trusted OS. In case of certification of this OS, certification of the IPsec support is then an add-on to the OS certification easily identifiable. Similarly, when certified cryptographic algorithms are used, the architecture according to an embodiment of the present invention eases the certification of the full IPsec support, independently of any guest OS benefiting from the support.

Virtualization Support

Some hardware architecture provides multi-level OS protections. The present invention enhances the protection of system resources, in particular to increase confidentiality and integrity of data at hardware level.

In this manner, a virtualized platform takes advantage of such hardware architecture to implement the trusted OS at the highest level of security while instantiating the virtualized operating systems at a lowest level. The IPsec driver, according to an embodiment of the present invention, is part of the trusted OS. The driver and the confidential data managed by this driver are then processed at a high level of security, higher than similar data handled by the operating systems. IPsec sensitive data, cryptographic keys for example, are thereby protected to a greater extent in such a hardware architecture.

Applications of networking stacks may require both transparent and secure communications according to the destination host. IPsec configuration rules may be used to specify that a given communication channel is uncrypted according to some criteria.

One alternative is to use different NICs, at the price of additional hardware resources.

The virtualized architecture proposed by the present invention enables the configuration of a networking stack connected to different virtual networks. These virtual networks can be connected to a single NIC through a transparent bridge or a secure bridge. Endpoint communications may be so crypted or not according to the virtual network used as support for the communication channel. There is no limitation of resources, no need of additional hardware resources. Crypted and uncrypted communications transit through different virtual networks whose mutual exclusion is guaranteed by the trusted OS.

Compared to known architectures, the present invention embodies the implementation of a minimal IPsec networking stack which takes advantage of a virtual networking support to supply generic, secure IP services to applications, whilst at the same time protecting sensitive IPsec configuration data and preserving both data integrity of the communication channels and networking configuration flexibility. Further, the architecture can be easily adapted to any OS able to act as trusted OS, or to any Virtual Machine Monitor (VMM).

Other Aspects and Embodiments

It will be clear from the forgoing that the above-described embodiments are only examples, and that other embodiments are possible and included within the scope of the invention as determined from the claims. For example, the architecture according to an embodiment of the present invention is independent of a particular model or implementation of hardware virtualization.

What is claimed is:

1. A data processing system comprising:
   a Network Interface Controller (NIC) to control access to a physical network;
   a first operating system comprising a NIC driver to manage the NIC, and a first Virtual Network Interface Controller (VNIC) driver;
   at least one second operating system comprising at least one second VNIC driver associated with a networking stack; and
   a Virtual Machine Monitor (VMM) VMM to enable concurrent operation of the first and second operating systems, and to emulate a virtual network, the VMM comprising first and second VNICs to provide access to the virtual network by the first and second operating systems through the first and second VNIC drivers, respectively;
   wherein the first operating system further comprises a bridge driver in between the NIC driver and the first VNIC driver to manage the connection between the physical network and the virtual network.

2. The data processing system of claim 1, wherein the first operating system further comprises an Internet Protocol security (IPsec) driver in between the bridge driver and the first VNIC driver to implement Internet Protocol IP security protocols.

3. The data processing system of claim 2, comprising, in between the bridge driver and the IPsec driver, a receive thread (rx) for communications from the physical network to the virtual network, and a transmit thread (tx) for communications from the virtual network to the physical network.

4. The data processing system of claim 2, wherein the IPsec driver comprises an Ethernet DDI, whereby the bridge driver is configurable as a client of the IPsec driver.

5. The data processing system of claim 2, wherein the first operating system comprises a further VNIC driver to provide access to the virtual network, and wherein the bridge driver is configured to route communication either between a transparent bridge from the further VNIC driver to the NIC driver via the bridge driver, or a secure bridge from the first VNIC driver to the NIC driver via the IPsec driver and the bridge driver.

6. The data processing system of claim 2, wherein the IPsec driver implements IPsec protocols as Bump In The Stack BITS.

7. The data processing system of claim 1, wherein the bridge driver comprises a receive thread (rx) for communications from the physical network to the virtual network, and a transmit thread (tx) for communications from the virtual network to the physical network.

8. The data processing system of claim 1, wherein the NIC driver and the VNIC driver each comprise an Ethernet Device Driver Interface DDI, whereby the bridge driver and/or the IPsec driver are configurable as clients of the NIC driver and/or the VNIC driver.

9. The data processing system of claim 1, wherein the first operating system is a trusted operating system and the second operating system is a guest operating system with lower system privileges than the trusted operating system, and wherein the data processing system is adapted to direct all communications between the guest operating system and the physical network through the trusted operating system.

* * * * *